(12) United States Patent
Ogawa et al.

(10) Patent No.: US 9,887,652 B2
(45) Date of Patent: Feb. 6, 2018

(54) CONTROLLING LEAD ANGLE USING A SINGLE MOTOR INTEGRATED CIRCUIT PIN

(71) Applicant: SEMICONDUCTOR COMPONENTS INDUSTRIES, LLC, Phoenix, AZ (US)

(72) Inventors: Takashi Ogawa, Ogaki (JP); Fumio Kumazawa, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/186,102

(22) Filed: Jun. 17, 2016

(65) Prior Publication Data

US 2017/0366119 A1    Dec. 21, 2017

(51) Int. Cl.
*H02P 6/06*    (2006.01)
*H02P 6/16*    (2016.01)

(52) U.S. Cl.
CPC .................................. *H02P 6/16* (2013.01)

(58) Field of Classification Search
CPC .......................................................... H02P 6/16
See application file for complete search history.

(56) References Cited

U.S. PATENT DOCUMENTS

| 5,923,134 | A  | * | 7/1999 | Takekawa | ................ | H02P 6/18 |
| | | | | | | 318/400.01 |
| 7,109,672 | B1 | * | 9/2006 | Mushika | ................ | G11B 19/04 |
| | | | | | | 318/139 |
| 2004/0078101 | A1 | | 4/2004 | Kondoh et al. | | |
| 2006/0179047 | A1 | | 8/2006 | Bresemann et al. | | |
| 2010/0211263 | A1 | * | 8/2010 | Lindenstruth | ........ | B62D 5/0472 |
| | | | | | | 701/41 |
| 2011/0279072 | A1 | * | 11/2011 | Shimizu | ................... | H02P 6/16 |
| | | | | | | 318/400.04 |
| 2012/0161680 | A1 | | 6/2012 | Kitagawa | | |
| 2013/0170951 | A1 | * | 7/2013 | Sato | ........................ | H02P 6/06 |
| | | | | | | 415/1 |
| 2014/0062355 | A1 | * | 3/2014 | Wang | ........................ | H02P 6/14 |
| | | | | | | 318/400.04 |
| 2014/0139153 | A1 | | 5/2014 | Aoki | | |
| 2015/0064023 | A1 | | 3/2015 | Sasaki et al. | | |
| 2015/0130384 | A1 | | 5/2015 | Mahdavi et al. | | |

(Continued)

FOREIGN PATENT DOCUMENTS

| JP | 62-205416 | 9/1987 |
| JP | 10-177403 | 6/1998 |
| JP | 11-015364 | 1/1999 |

(Continued)

*Primary Examiner* — Shawki S Ismail
*Assistant Examiner* — Muhammad S Islam
(74) *Attorney, Agent, or Firm* — Conley Rose, P.C.

(57) ABSTRACT

A system, in some embodiments, comprises: an analog-to-digital converter (ADC) configured to receive a discrete analog voltage and to generate a digital bit value representing said analog voltage; control logic, coupled to the ADC, configured to identify a target intercept and a target slope for a lead angle curve based on the digital bit value; and a motor, coupled to the control logic, configured to operate based on a lead angle identified using said lead angle curve, wherein the ADC receives the analog voltage via a single integrated circuit pin.

20 Claims, 9 Drawing Sheets

(56) References Cited

U.S. PATENT DOCUMENTS

2015/0180388 A1 6/2015 Ogawa
2015/0180390 A1 6/2015 Ogawa

FOREIGN PATENT DOCUMENTS

| | | |
|---|---|---|
| JP | 2000-091923 | 3/2000 |
| JP | 2004-310846 | 11/2004 |
| JP | 2008-131805 | 6/2008 |
| JP | 2011-196723 | 10/2011 |
| JP | 2012-119767 | 6/2012 |
| JP | 2013-132200 | 7/2013 |

* cited by examiner

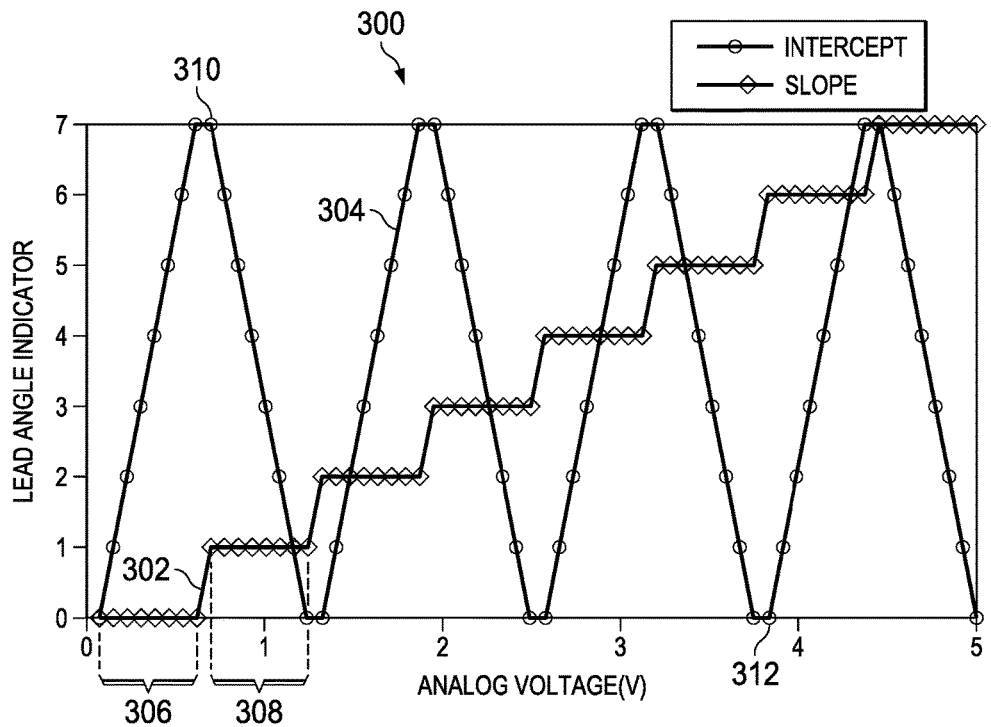
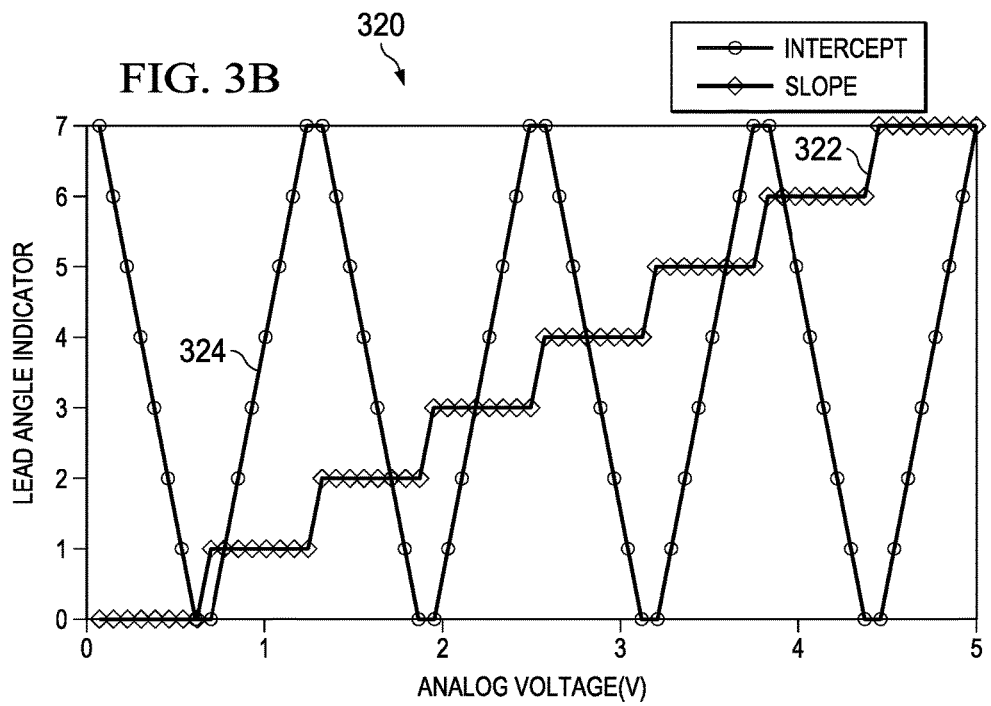

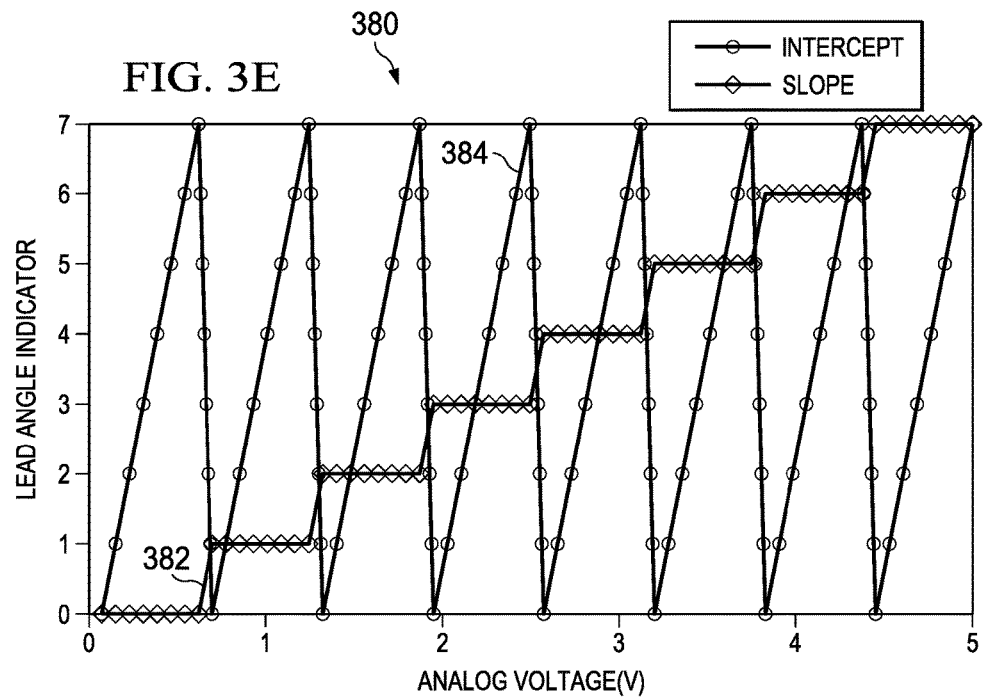
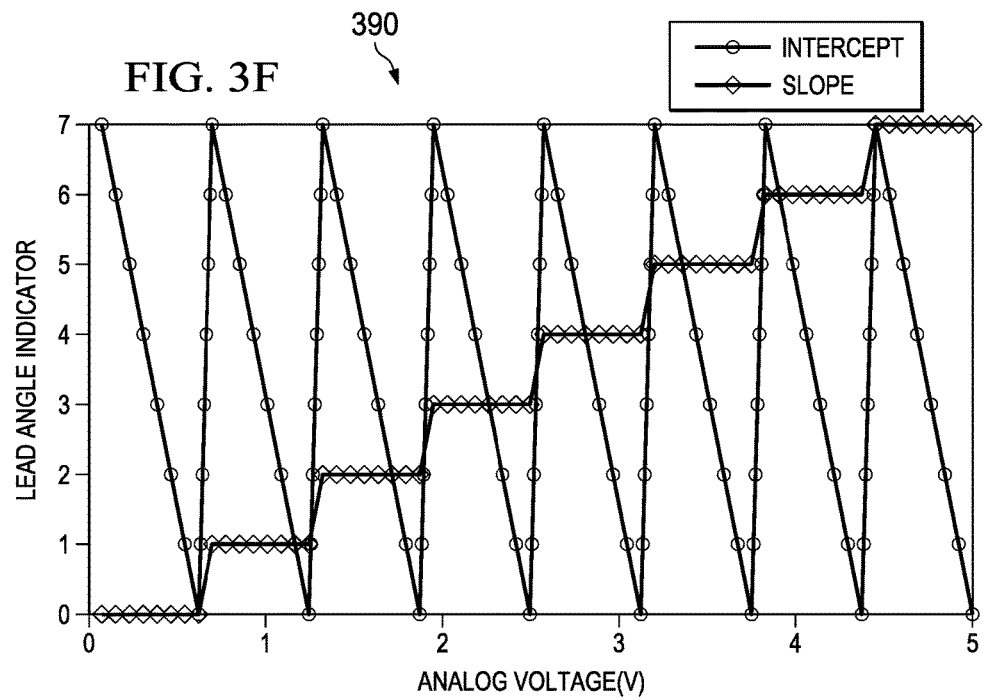

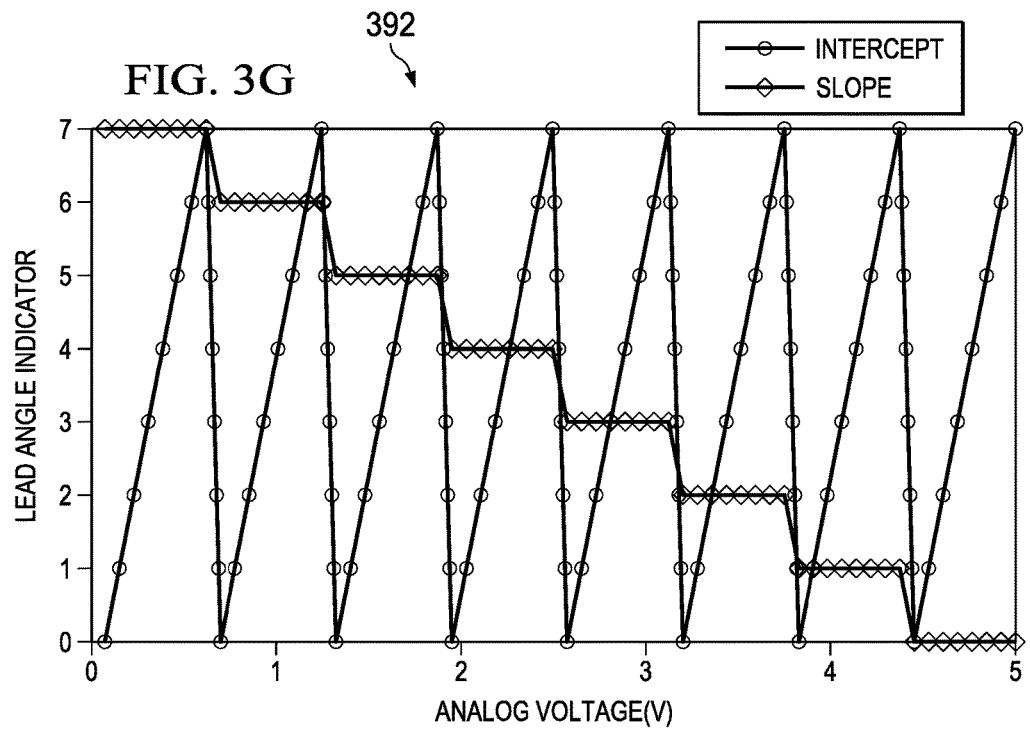
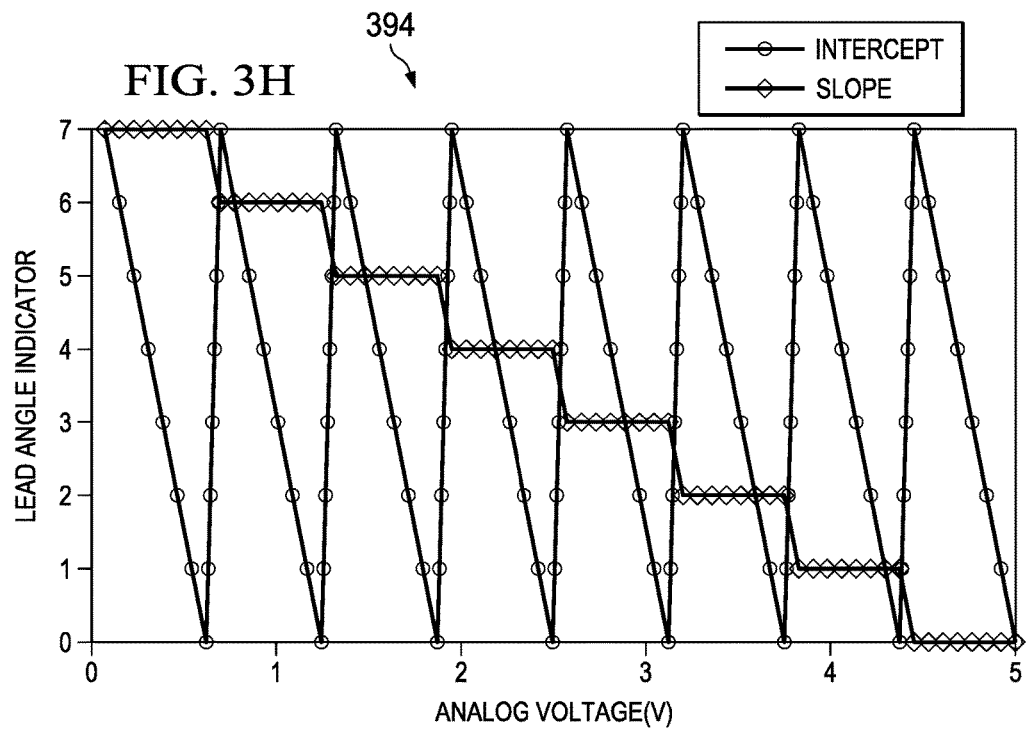

400

| INDEX | ANALOG VOLTAGE (V) | DIGITAL BIT VALUE |
|---|---|---|
| 0 | 0.000-0.078 | 000 000 |
| 1 | 0.079-0.156 | 000 001 |
| 2 | 0.157-0.234 | 000 010 |
| 3 | 0.235-0.313 | 000 011 |
| 4 | 0.314-0.391 | 000 100 |
| 5 | 0.392-0.469 | 000 101 |
| 6 | 0.470-0.547 | 000 110 |
| 7 | 0.548-0.625 | 000 111 |
| 8 | 0.626-0.703 | 001 000 |
| 9 | 0.704-0.781 | 001 001 |
| 10 | 0.782-0.859 | 001 010 |
| 11 | 0.860-0.938 | 001 011 |
| 12 | 0.939-1.016 | 001 100 |
| 13 | 1.017-1.094 | 001 101 |
| 14 | 1.095-1.172 | 001 110 |
| 15 | 1.173-1.250 | 001 111 |
| 16 | 1.251-1.328 | 010 000 |
| 17 | 1.329-1.406 | 010 001 |
| 18 | 1.407-1.484 | 010 010 |
| 19 | 1.485-1.563 | 010 011 |
| 20 | 1.564-1.641 | 010 100 |
| 21 | 1.642-1.719 | 010 101 |
| 22 | 1.720-1.797 | 010 110 |
| 23 | 1.798-1.875 | 010 111 |
| 24 | 1.876-1.953 | 011 000 |
| 25 | 1.954-2.031 | 011 001 |
| 26 | 2.032-2.109 | 011 010 |
| 27 | 2.110-2.188 | 011 011 |
| 28 | 2.189-2.266 | 011 100 |
| 29 | 2.267-2.344 | 011 101 |
| 30 | 2.345-2.422 | 011 110 |
| 31 | 2.423-2.500 | 011 111 |
| 32 | 2.501-2.578 | 100 000 |
| 33 | 2.579-2.656 | 100 001 |
| 34 | 2.657-2.734 | 100 010 |
| 35 | 2.735-2.813 | 100 011 |
| 36 | 2.814-2.891 | 100 100 |
| 37 | 2.892-2.969 | 100 101 |
| 38 | 2.970-3.047 | 100 110 |
| 39 | 3.048-3.125 | 100 111 |
| 40 | 3.126-3.203 | 101 000 |
| 41 | 3.024-3.281 | 101 001 |
| 42 | 3.282-3.359 | 101 010 |
| 43 | 3.360-3.438 | 101 011 |
| 44 | 3.439-3.516 | 101 100 |
| 45 | 3.517-3.594 | 101 101 |
| 46 | 3.595-3.672 | 101 110 |
| 47 | 3.673-3.750 | 101 111 |
| 48 | 3.751-3.828 | 110 000 |
| 49 | 3.829-3.906 | 110 001 |
| 50 | 3.907-3.984 | 110 010 |
| 51 | 3.985-4.063 | 110 011 |
| 52 | 4.064-4.141 | 110 100 |
| 53 | 4.142-4.219 | 110 101 |
| 54 | 4.220-4.297 | 110 110 |
| 55 | 4.298-4.375 | 110 111 |
| 56 | 4.376-4.453 | 111 000 |
| 57 | 4.454-4.531 | 111 001 |
| 58 | 4.532-4.609 | 111 010 |
| 59 | 4.610-4.689 | 111 011 |
| 60 | 4.690-4.766 | 111 100 |
| 61 | 4.767-4.844 | 111 101 |
| 62 | 4.845-4.922 | 111 110 |
| 63 | 4.923-5.000 | 111 111 |

FIG. 4

| INTERCEPT INDICATOR | 0 | 1 | 2 | 3 | 4 | 5 | 6 | 7 |
|---|---|---|---|---|---|---|---|---|
| INTERCEPT (DEGREES) | -30 | -22.5 | -15 | -7.5 | 0 | 7.5 | 15 | 22.5 |

| SLOPE INDICATOR | 0 | 1 | 2 | 3 | 4 | 5 | 6 | 7 |
|---|---|---|---|---|---|---|---|---|
| SLOPE (DEGREES/Hz) | 0/400 | 7.5/400 | 15/400 | 22.5/400 | 30/400 | 37.5/400 | 45/400 | 52.5/400 |

CONTROLLING LEAD ANGLE USING A SINGLE MOTOR INTEGRATED CIRCUIT PIN

BACKGROUND

Motors of various types are often controlled using integrated circuits (ICs). A motor IC receives various input signals and uses those input signals to control different facets of the motor's operation, such as lead angle, duty cycle, direction of motor rotation and thresholds at which motor rotation is enabled or shut off. The input signals that the IC uses to control the motor must be provided to the IC using separate input pins. Each such input pin occupies space and adds undesirable complexity and expense. Thus, reducing the number of input pins used is desirable.

SUMMARY

At least some of the embodiments disclosed herein are directed to a system, comprising: an analog-to-digital converter (ADC) configured to receive a discrete analog voltage and to generate a digital bit value representing said analog voltage; control logic, coupled to the ADC, configured to identify a target intercept and a target slope for a lead angle curve based on the digital bit value; and a motor, coupled to the control logic, configured to operate based on a lead angle identified using said lead angle curve, wherein the ADC receives the analog voltage via a single integrated circuit pin. One or more of these embodiments may be supplemented using one or more of the following concepts, in any order and in any combination: wherein to generate said digital bit value, the ADC is configured based on one or more data structures that cross-reference multiple analog voltage values with multiple target intercept indicators and that cross-reference said multiple analog voltage values with multiple target slope indicators; wherein a portion of the digital bit value encodes one of said multiple target intercept indicators and wherein another portion of the digital bit value encodes one of said multiple target slope indicators; wherein the control logic comprises a different data structure that cross-references the encoded target intercept indicator with said target intercept and cross-references the encoded target slope indicator with said target slope; wherein the control logic is configured to use said another data structure to identify said target intercept and said target slope; wherein said one or more data structures comprises one or more graphs, said one or more graphs including multiple curves, at least one of said multiple curves associated with said target intercept and another one of said multiple curves associated with said target slope; wherein said curve associated with the target slope has a stair-step pattern, and wherein said curve associated with the target intercept has a triangular wave pattern; wherein the curve associated with the target slope increases as the multiple analog voltage values increase, and wherein the curve associated with the target intercept rises for the first step in said stair-step pattern; wherein the curve associated with the target slope increases as the multiple analog voltage values increase, and wherein the curve associated with the target intercept falls for the first step in said stair-step pattern; wherein the curve associated with the target slope decreases as the multiple analog voltage values increase, and wherein the curve associated with the target intercept rises for the first step in said stair-step pattern; wherein the curve associated with the target slope decreases as the multiple analog voltage values increase, and wherein the curve associated with the target intercept falls for the first step in said stair-step pattern; wherein said curve associated with the target slope has multiple segments, each segment corresponding to a different one of the multiple target slope indicators, and wherein said curve associated with the target intercept traverses a range of the multiple target intercept indicators for each of said multiple segments; wherein the ADC is configured to generate said digital bit value by quantizing the analog voltage to one of a predetermined set of possible analog voltages; wherein the control logic comprises a data structure that cross-references said digital bit value with the target intercept and the target slope; further comprising a voltage divider circuit, coupled to the single pin, configured to provide said analog voltage to the single pin; wherein said digital bit value is a 6-bit value.

At least some embodiments are directed to a method, comprising: receiving a discrete analog voltage on a single integrated circuit input pin; determining a target intercept and a target slope of a lead angle curve based on said discrete analog voltage; and operating a motor using said lead angle curve. At least some of these embodiments may be supplemented using one or more of the following concepts, in any order and in any combination: further comprising producing a digital bit value based on said discrete analog voltage and using said digital bit value to determine the target intercept and target slope, wherein producing the digital bit value comprises using a data structure that cross-references a set of target intercept indicators and a set of target slope indicators with a range of analog voltage values; wherein, in the data structure, each target slope indicator in said set of target slope indicators corresponds to a range of target intercept indicators; wherein, when the target slope indicators in said set of target slope indicators are sorted in ascending order, the range of target intercept indicators corresponding to the first of the target slope indicators rises as said range of analog voltage values rises; wherein, in the data structure, each target intercept indicator in said set of target intercept indicators corresponds to a range of target slope indicators.

BRIEF DESCRIPTION OF THE DRAWINGS

In the drawings:

FIGS. 3A-3H are data structures cross-referencing analog voltage values with lead angle intercept indicators and lead angle slope indicators.

FIG. 4 is a quantization data structure cross-referencing analog voltage values with digital bit values.

Figure 1A:
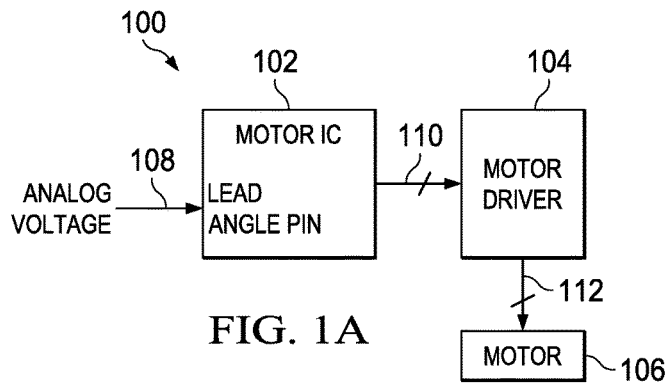
FIG. 1A is a block diagram of a motor system.

The specific embodiments given in the drawings and detailed description do not limit the disclosure. On the contrary, they provide the foundation for one of ordinary skill to discern the alternative forms, equivalents and modifications that are encompassed together with one or more of the given embodiments in the scope of the appended claims. The term "couple" and variants thereof, as used herein, indicate a direct or indirect connection.

DETAILED DESCRIPTION

Disclosed herein are techniques for using a single motor integrated circuit (IC) input pin to control the lead angle used in a motor system. Specifically, the motor IC receives a discrete analog voltage at the input pin, produces a digital bit value corresponding to the analog voltage, decodes the digital bit value to identify a lead angle curve target intercept and a lead angle curve target slope, and uses the target intercept and slope—which, together, define a lead angle curve—to operate a motor.

Figure 2:
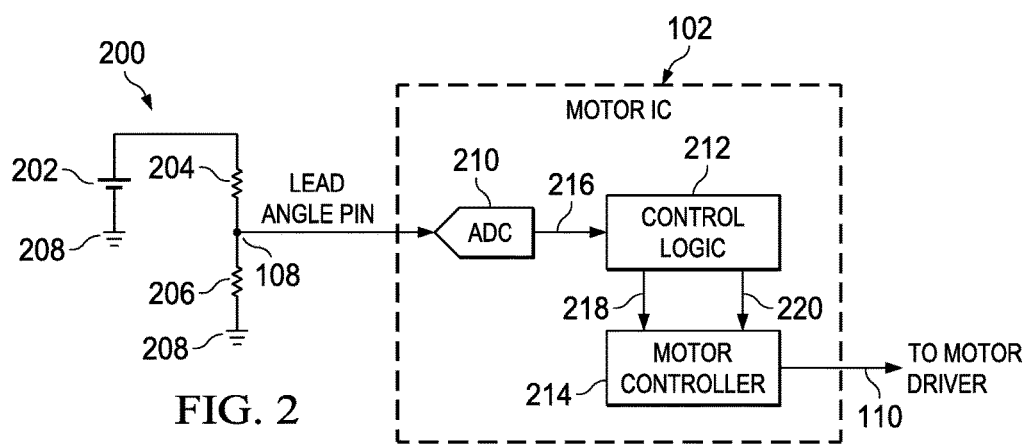
FIG. 2 is a block diagram of a motor integrated circuit (IC) and a schematic diagram of a voltage divider circuit.

FIG. 1A is a block diagram of a motor system 100 that comprises a motor IC 102 coupled to a motor driver 104 which, in turn, couples to a motor 106. The motor IC 102 has numerous input pins at which it receives input signals that determine the IC's behavior, such as a lead angle pin connection 108 at which the IC 102 receives an analog voltage. The analog voltage may be provided by, e.g., a voltage divider circuit as shown in FIG. 2 and as described in greater detail below. The motor IC 102 requires only a single, discrete analog voltage at the lead angle pin to function as described in this disclosure; however, the scope of disclosure is not limited to using a single analog voltage, and multiple analog voltages may continually be supplied to the lead angle pin for sampling and processing as described herein. The motor IC converts the discrete analog voltage at the lead angle pin to a digital bit value and decodes the digital bit value to determine a target lead angle intercept indicator and a target lead angle slope indicator. The target lead angle intercept indicator is not an intercept of a lead angle curve, nor is the target lead angle slope indicator a slope of a lead angle curve. Rather, the indicators are numbers—e.g., on a predetermined scale of 0-7—that represent actual intercept and slope values and are used to facilitate decoding a target lead angle intercept and a target lead angle slope from the digital bit value, as described below. The motor IC uses the target indicators to determine the target lead angle intercept and slope. The target intercept and slope define a lead angle curve. The motor IC 102 uses the lead angle curve to control the motor 106 via the motor driver 104 and connections 110 and 112.

Figure 1B:
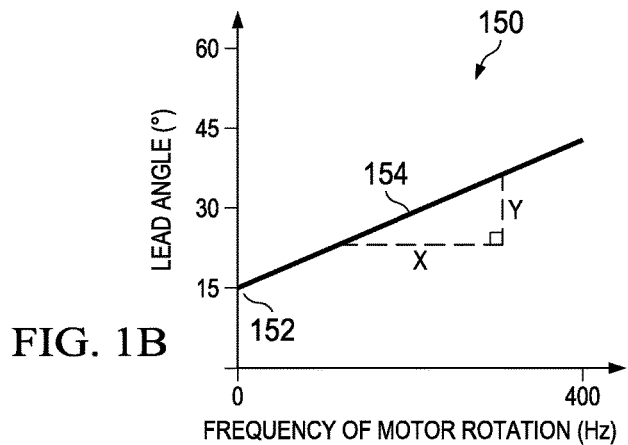
FIG. 1B is a graph depicting an illustrative lead angle curve.

FIG. 1B is a graph depicting an illustrative lead angle curve 150. The x-axis of the graph corresponds to the frequency of motor rotation in Hertz, and the y-axis of the graph corresponds to the lead angle in degrees. The curve 150 has an intercept 152 on the y-axis—in this illustration, at 15 degrees. The curve 150 also has an associated slope, denoted by the numeral 154, where the slope is equivalent to the increase in lead angle divided by the corresponding increase in frequency (i.e., y/x).

FIG. 2 is a block diagram of the motor IC 102 and a schematic diagram of a voltage divider circuit 200. Specifically, the motor IC 102 includes an analog-to-digital converter (ADC) 210, control logic 212 coupled to the ADC 210 via connection 216, and a motor controller 214 coupled to the control logic 212 via connections 218 and 220. The output of the motor controller 214 is a connection 110, and the input to the ADC 210 is a connection (i.e., lead angle pin) 108. The connection 108 couples to a voltage divider circuit 200, the purpose of which is to provide the lead angle pin with an analog voltage that the motor IC 102 will use to determine the lead angle curve used to operate the motor.

The voltage divider circuit 200 includes a voltage source 202 (e.g., ranging from 0 V to 5 V), a resistor 204 (e.g., 10 kilo-Ohms), a resistor 206 (e.g., 10 kilo-Ohms), and ground connections 208.

Still referring to FIG. 2, in operation, the voltage divider circuit 200 provides an analog voltage to the lead angle pin at connection 108. The analog voltage may vary depending on the voltage output by the source 202 and the resistances of the resistors 204 and 206. The value of the analog voltage provided at the lead angle pin will determine the lead angle curve (i.e., lead angle as a function of motor rotation frequency) according to which the motor operates. Accordingly, the values of the source 202 and resistors 204, 206 are selected such that the analog voltage produced at the lead angle pin causes a target intercept and target slope defining a desired lead angle curve to be implemented. In at least some embodiments, the lead angle response of the motor IC 102 is known so that an appropriate analog voltage may be provided at the lead angle pin to implement the target intercept and target slope for a desired lead angle curve.

Still referring to FIG. 2, the ADC 210 samples the analog voltage present at the lead angle pin. The sampled analog voltage is described herein as being a "discrete analog voltage," meaning that a single analog voltage value is used to determine the target intercept and target slope of the desired lead angle curve. However, in at least some embodiments, the voltage divider circuit 200 (or other source) will continuously provide an analog voltage at the lead angle pin, and the ADC 210 may repeatedly sample the voltage present at the lead angle pin so that variations in the analog voltage may be reflected in the lead angle curve that is implemented. Thus, references herein to the fact that the desired lead angle curve may be determined using a discrete analog voltage at a single input pin do not limit the scope of disclosure. Additional analog voltages may be sampled and used to modify the lead angle curve implemented.

Still referring to FIG. 2, the ADC 210 generates a digital bit value (e.g., with a 3-bit or 6-bit resolution) based on the sampled analog voltage from the lead angle pin. The ADC 210 may be configured to convert the sampled analog voltage in a variety of ways, some of which are now described.

Referring to both FIG. 2 and FIG. 3A, FIG. 3A is a data structure 300 cross-referencing analog voltage values (x-axis) with lead angle intercept indicators and lead angle slope indicators (y-axis). As explained, the intercept and slope indicators along the y-axis are not actual intercept and slope values such as those shown in FIG. 1B; rather, they are placeholder-type values that are used to facilitate implementation of the digital encoding and decoding techniques described herein. The data structure 300 depicts a target intercept curve 304 and a target slope curve 302. The slope curve 302 has a stair-step pattern, and the intercept curve 304 has a triangular wave pattern. Each step in the stair-step pattern of the slope curve 302 corresponds to the same range of intercept indicator values in the intercept curve 304. For example, the horizontal (x-axis) width of the step 306 of curve 302 corresponds to an upward sweep from 0 to 7 of the intercept curve 304. Similarly, the horizontal width of the step 308 of curve 302 corresponds to a downward sweep from 7 to 0 of the intercept curve 304. This relationship between the curves 302, 304 persists throughout the data structure.

Still referring to FIGS. 2 and 3A, the range of possible analog values that may be sampled at the lead angle pin is provided on the x-axis of the data structure 300. Each possible analog value corresponds to a point on the curve 302 and to a point on the curve 304. For instance, an analog voltage of 1 V corresponds to a curve 302 value of 1, and it corresponds to a curve 304 value of 3. The ADC 210 is configured using the data structure 300 to generate a digital bit value that encodes the two points on the curves 302, 304 corresponding to the analog voltage provided at the lead angle pin. For instance, if the analog voltage is 1 V, the ADC 210 generates a digital bit value encoding a curve 302 value of 1 and a curve 304 value of 3. If the ADC 210 has a 6-bit resolution, and the three most significant bits are dedicated to indicator values for curve 302 and the three least significant bits are dedicated to indicator values for curve 304, then an analog voltage of 1 V might result in a digital bit value of 001011 (the "001" portion corresponding to the curve 302 value of 1, and the "011" portion corresponding to the curve 304 value of 3). In another example, an analog voltage of 4.2 V corresponds to a slope curve 302 value of 6 and to an intercept curve 304 value of 5. In this example, the ADC 210 may produce a digital bit value of 110101, with the three most significant bits corresponding to 6 and the three least significant bits corresponding to 5. For purposes of this discussion, this conversion scheme is referred to as the first conversion scheme. The scope of disclosure is not limited to any particular mapping between digital bits and intercept or slope indicators.

Figure 3C:
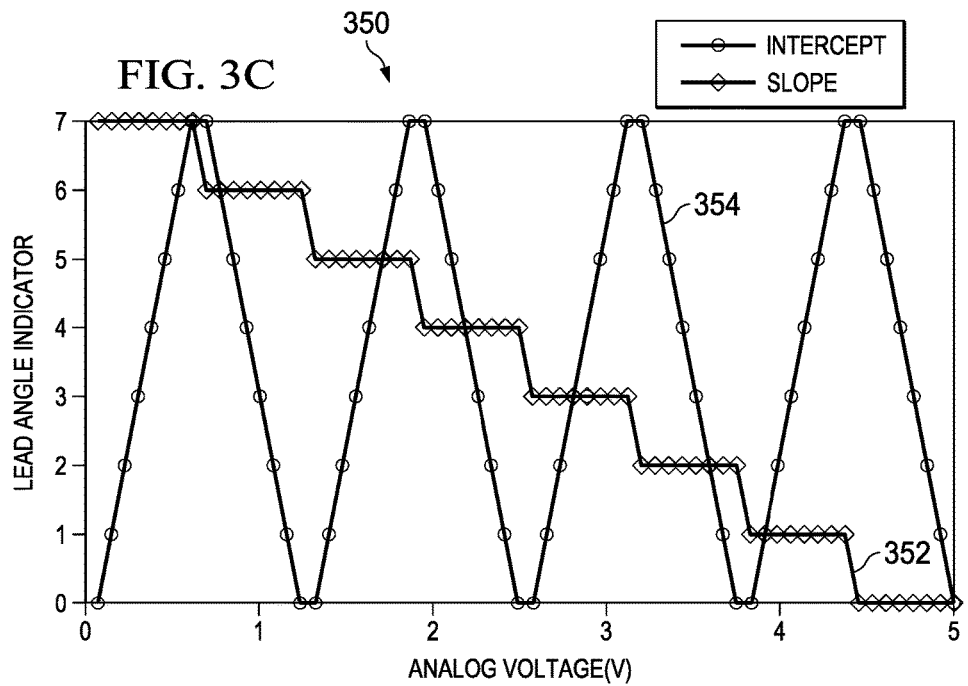
Figure 3D:
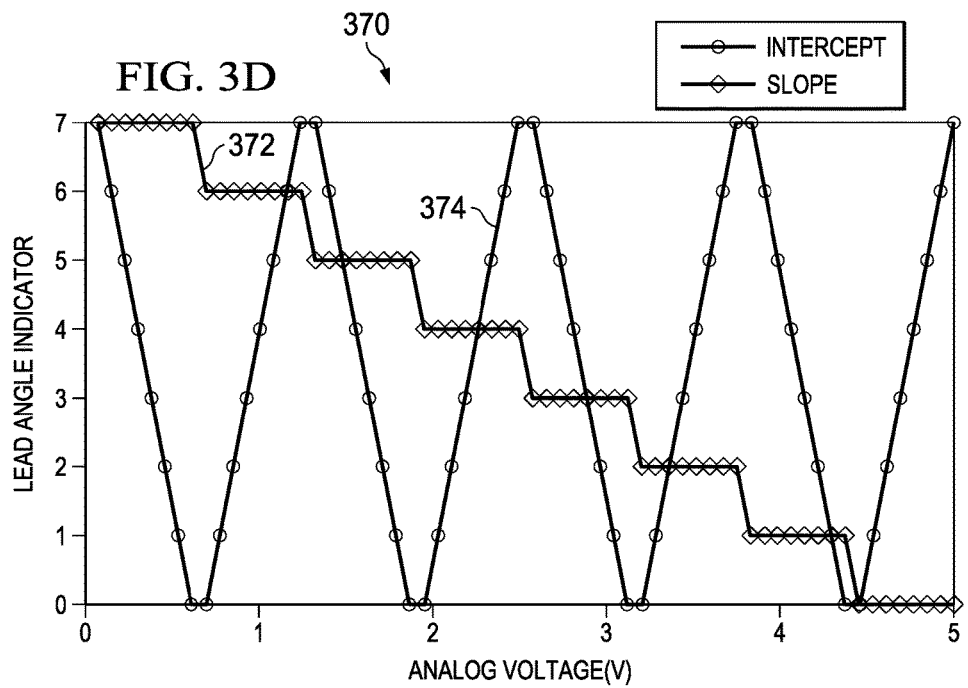

The scope of disclosure encompasses any and all variations of the data structure 300. For instance, FIG. 3B depicts a data structure 320 with a slope curve 322 and an intercept curve 324. FIG. 3B differs from FIG. 3A in that the intercept curve 324 is inverted. FIG. 3C depicts another variant. The data structure 350 depicts a slope curve 352 and an intercept curve 354. FIG. 3C differs from FIG. 3A in that the slope curve 352 has a descending stair-step pattern rather than an ascending pattern. FIG. 3D depicts a data structure 370 having a slope curve 372 and an intercept curve 374. FIG. 3D differs from FIG. 3A in that the intercept curve 374 is inverted and the slope curve 372 has a descending stair-step pattern. FIG. 3E depicts yet another variant data structure 380 having a slope curve 382 and an intercept curve 384. FIG. 3E differs from FIG. 3A in that each step of slope curve 382 corresponds to an ascending sweep of the intercept curve 384, whereas in FIG. 3A, the intercept curve 304 alternates between ascending and descending sweeps, as shown. FIGS. 3F-3H depicts additional variant data structures 390, 392 and 394, respectively. FIGS. 3F-3H differ from FIG. 3E in a manner similar to the way in which FIGS. 3B-3D differ from FIG. 3A, respectively. None of the data structures in FIGS. 3A-3H are restricted to the precise x-axis or y-axis ranges shown. In addition, in each of the FIGS. 3A-3H, the curve representing intercepts may actually represent slopes, and the curve representing slopes may actually represent intercepts.

The ADC 210 may be configured to convert the sampled analog voltage to a digital bit value using a second conversion scheme. Referring to FIG. 3A, the ADC 210 may be configured to determine the points on the curves 302, 304 corresponding to the sampled analog voltage and may be further configured to produce digital bit values using a counting technique. For example, if the analog voltage is 1 V, the ADC 210 may produce the most significant three bits as 001, since the analog voltage of 1 V corresponds to the second step in the stair-step pattern of slope curve 302. Similarly, if the analog voltage is 1 V, the ADC 210 may produce the least significant three bits as 101, since the analog voltage of 1 V corresponds to the fifth point in the downward sweep of the intercept curve 304 from 7 to 0. (The least significant bits may be encoded in some embodiments as 100, since 1 V may correspond to the fourth point in the sweep, depending on the resolution of the analog voltage—e.g., 1.016 V could be encoded as 100 and 1.017 V could be encoded as 101). A similar type of ADC conversion scheme may be used with respect to FIGS. 3B-3H.

The ADC 210 may be configured to convert the sampled analog voltage to a digital bit value using a third conversion scheme. FIG. 4 is a data structure 400 cross-referencing various analog voltage sub-ranges in an illustrative range of 0 V to 5 V with corresponding digital bit values. The data structure 400 is a quantization table that may be used to configure the ADC 210 so that a sampled analog voltage is quantized and an appropriate digital bit value is provided at the output of the ADC 210. Because the ADC 210 in the running example has a 6-bit resolution, the illustrative analog voltage range of 0 V to 5 V is divided into 64 ($2^6$=64) possible quantized sub-ranges, although the scope of disclosure is not limited to any particular ADC resolution, analog voltage ranges or quantization scheme. Accordingly, for instance, the ADC 210 may be configured to output a digital bit value of 001001 when it samples an analog voltage of 0.711 V.

Similarly, it may be configured to output a digital bit value of 111111 when it samples an analog voltage of 5.0 V. The scope of disclosure is not limited to the foregoing ADC configuration schemes. Any configuration scheme that enables the ADC to sample an analog value at the lead angle pin and to output a digital bit value that represents the lead angle curve target slope and target intercept are contemplated.

Figures 5, 6:
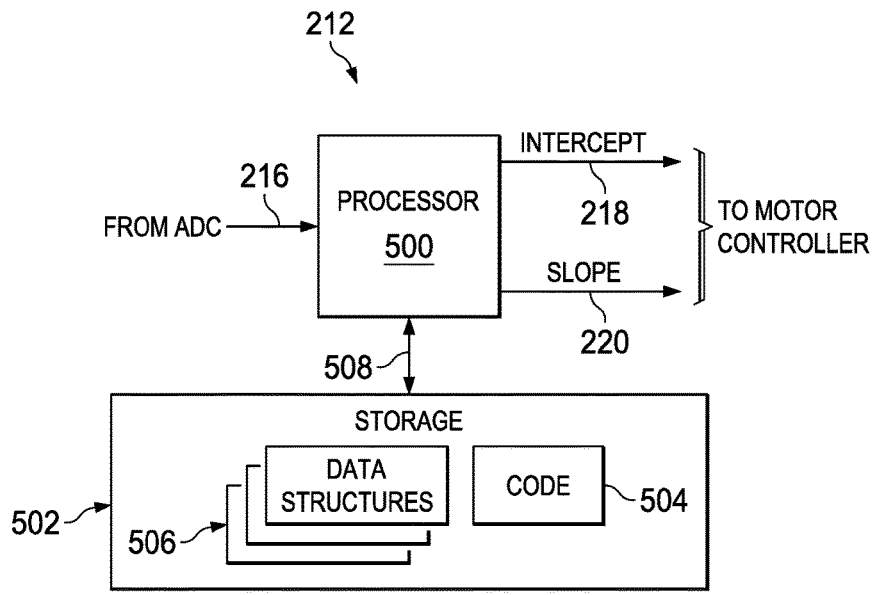
FIG. 5 is a block diagram of a control logic in the motor IC.
FIG. 6 is a data structure cross-referencing lead angle intercept and slope indicators with lead angle intercept and slope values.

FIG. 5 is a block diagram of the control logic 212. Specifically, the control logic 212 comprises a processor 500 coupled to storage (e.g., random access memory, read-only memory) 502 via connection 508. The storage 502 stores code 504 (e.g., software and/or firmware), which, when executed, causes the processor 500 to perform one or more of the functions attributed herein to the control logic 212. The storage 502 additionally comprises one or more data structures 506. These data structures 506 may include, for instance, any of the data structures depicted in FIGS. 3A-3H, FIG. 4, FIGS. 6-7, and/or variants thereof. The processor 500 receives digital bit values from the ADC 210 via connection 216. The processor 500 decodes the digital bit values to determine target intercept and target slope values that it outputs on connections 218 and 220, respectively, to the motor controller 214 (FIG. 2). The processor 500 may decode incoming digital bit values in multiple ways, depending on the conversion scheme with which the ADC 210 is configured. Some of these decoding schemes are now described.

If the ADC 210 is configured using the first conversion scheme described above, the processor 500 decodes the digital bit value as follows. The processor 500 receives a digital bit value and parses the digital bit value to determine the intercept and slope indicators encoded therein. For example, a received digital bit value of 001111 may be parsed into the most significant three bits ("001") and the least significant three bits ("111"). The processor 500 may then determine the intercept indicator associated with the most significant bits. In this example, the bits "001" correspond to a target slope indicator value of 1 because, as is well-known, the digital value 001 corresponds to a decimal value of 1. The processor 500 performs a similar process with the least significant bits 111, yielding a target intercept indicator value of 7. The processor 500 then uses the data structures 600, 650 shown in FIG. 6 to determine the target intercept and target slope values that are to be provided to the motor controller. In the running example, the target slope indicator value of 1 corresponds to a target slope of 7.5 degrees/400 Hz in the data structure 650. Likewise, the target intercept indicator value of 7 corresponds to a target intercept of 22.5 degrees in the data structure 600. The processor 500 subsequently provides a signal on connection 218 indicating a target intercept of 22.5 degrees and another signal on connection 220 indicating a target slope of 7.5 degrees/400 Hz. The motor controller 214 (FIG. 2) uses these values to operate the motor accordingly. The values and cross-references shown in the data structures 600, 650—as with all data structures described in this disclosure—are merely illustrative and do not limit the scope of the disclosure.

If the ADC 210 is configured using the second conversion scheme described above, the processor 500 receives and parses the digital bit value as described above. However, the processor 500 interprets the parsed bits in a different way than described above. Specifically, if the digital bit value 001111 is received, the processor 500 parses this digital bit value into the three most significant bits ("001") and three least significant bits ("111"). The processor 500 then identifies the data structure that was used to configure the ADC 210—for example, data structure 300 in FIG. 3A—and uses the data structure to interpret the parsed bits. For example, the processor 500 determines that the bits 001 correspond to the second step 308 (FIG. 3A) of the slope curve 302, and the processor 500 further determines that the slope indicator is thus 1.

Similarly, the processor 500 determines that the bits 111 correspond to the last point of a sweep of the intercept curve 304. However, the processor 500 cannot determine from the bits 111 alone whether the sweep in question is an upward sweep or a downward sweep. Determining whether the sweep is upward or downward is important at least because the last point in an upward sweep corresponds to a different intercept indicator value than does the last point in a downward sweep. Accordingly, to determine whether the sweep is an upward or downward sweep, the processor 500 determines whether the least significant bit of the three most significant bits is even or odd. If it is even, the three least significant bits correspond to an upward sweep of the intercept curve 304, and if it is odd, they correspond to a downward sweep of the intercept curve 304. This can be seen in FIG. 3A, since all steps of the curve 302 associated with an odd bit correspond to downward sweeps of the curve 304, and all steps of the curve 302 associated with an even bit correspond to upward sweeps of the curve 304. In the running example, the three most significant bits are 001, and the least significant of these is "1"—an odd bit. This means that the least three significant bits—i.e., 111—correspond to a downward sweep of the curve 304. As shown in FIG. 3A, the step 308 corresponds to a downward sweep of the curve 304. Determining whether the sweep is upward or downward enables the processor 500 to accurately determine the intercept indicator that corresponds to the three least significant bits. Because the three least significant bits—i.e., 111—are associated with a downward sweep, and because 111 is equivalent to a decimal number 7, the processor 500 may count 7 points down from the top of the sweep (numeral 310), ultimately resulting in an intercept indicator of 0. (Had the processor 500 counted 7 points along an upward sweep, it would have determined an intercept indicator of 7, thus highlighting the importance of determining whether the three least significant bits correspond to an upward or downward sweep.) After the processor 500 identifies the appropriate target slope and intercept indicators, it may use the data structure 600, 650 (FIG. 6) to determine and output the appropriate target slope and intercept values on connections 218, 220. The motor controller 214 (FIG. 2) uses these values to operate the motor accordingly.

Figure 7:
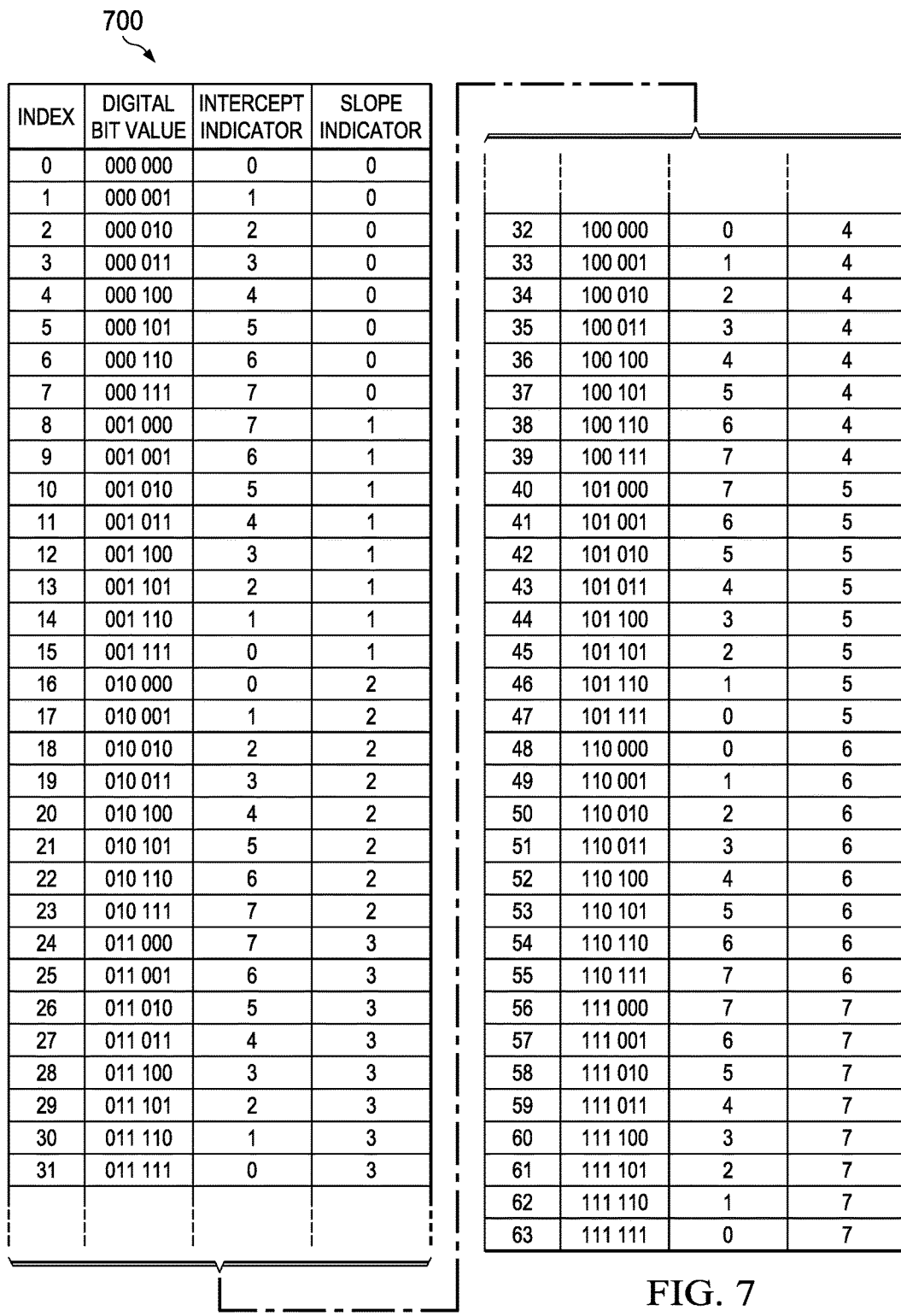
FIG. 7 is a data structure cross-referencing digital bit values with lead angle intercept and slope indicators.

An alternative decoding technique may be used if the ADC 210 is configured using the second conversion scheme described above. FIG. 7 depicts a data structure 700 (stored, e.g., as one of the data structures 506 in FIG. 5) that the processor 500 may use to efficiently determine slope and intercept indicators based on an incoming digital bit value. The illustrative data structure 700 cross-references each possible digital bit value with a corresponding slope indicator and intercept indicator. Thus, continuing with the running example, if the processor 500 receives a digital bit value of 001111, it determines that the corresponding target slope indicator is 1 and the corresponding target intercept indicator is 0 in the data structure 700.

If the ADC 210 is configured using the third conversion scheme described above, the processor 500 may decode the digital bit value using either of the techniques described above with respect to the second conversion scheme.

Figure 8:
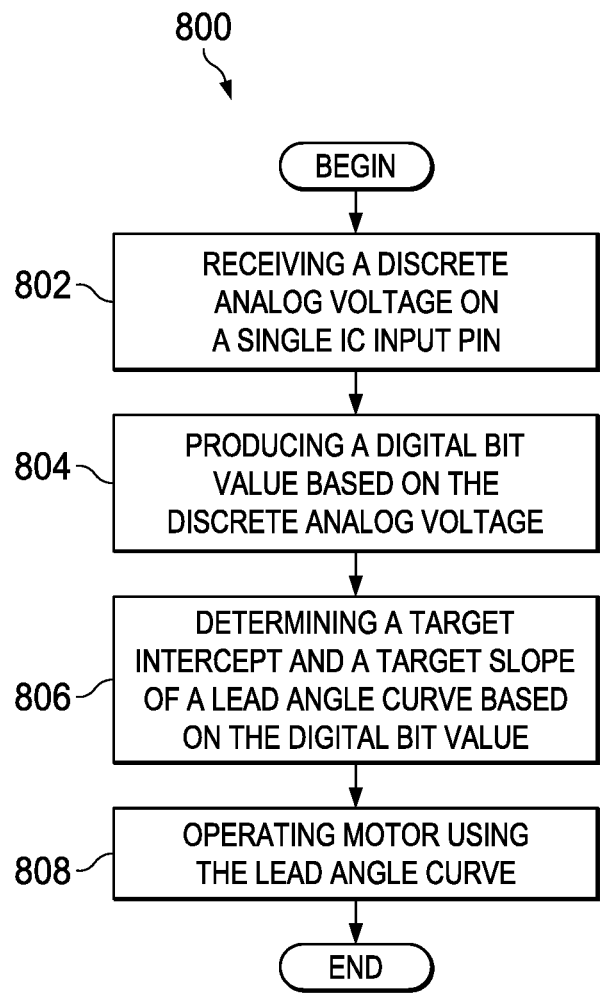
FIG. 8 is a flow diagram of a method for controlling a lead angle using a discrete analog voltage provided via a single motor IC pin.

FIG. 8 is a flow diagram of a process 800 for controlling a lead angle using a discrete analog voltage provided via a single motor IC lead angle pin. The process 800 comprises receiving a discrete analog voltage on a single IC input pin (step 802). The process 800 subsequently comprises producing a digital bit value based on the discrete analog voltage (step 804). Any of the foregoing ADC conversion schemes may be used to produce the digital bit value in step 804, and any and all suitable variations thereof also may be used. Similarly, one or more of the data structures described above may be used to facilitate a suitable ADC conversion scheme. The process 800 next includes determining a target intercept and a target slope of a lead angle curve based on the digital bit value (step 806). This step is performed using any of the decoding techniques described above with respect to the processor 500 of FIG. 5 as well as with one or more of the data structures described above. The process 800 comprises operating the motor based on the lead angle curve defined by the target intercept and target slope identified in step 806 (step 808). The process 800 may be modified as desired, including by adding, deleting, modifying or rearranging one or more steps.

Numerous other variations and modifications will become apparent to those skilled in the art once the above disclosure is fully appreciated. It is intended that the following claims be interpreted to embrace all such variations, modifications and equivalents.

What is claimed is:

1. A system, comprising:
    an analog-to-digital converter (ADC) configured to:
        receive a discrete analog voltage via a single integrated circuit pin to control a lead angle in a motor; and
        generate a digital bit value comprising a plurality of digital bits representing said analog voltage, said digital bit value encoding a target intercept indicator value as at least a first of the plurality of digital bits and a target slope indicator value as at least a second of the plurality of digital bits according to the discrete analog voltage; and
    control logic, coupled to the ADC, configured to:
        identify a target intercept and a target slope for a lead angle curve by decoding the digital bit value to determine the target intercept at least partially according to the first of the plurality of digital bits and determine the target slope at least partially according to the second of the plurality of digital bits, wherein the target intercept indicates a lead angle value at zero motor rotation frequency, and wherein the target slope indicates a rate of change of the lead angle curve corresponding to a change in the motor rotation frequency; and control the motor based on the lead angle identified using said lead angle curve.

2. The system of claim 1, wherein to generate said digital bit value, the ADC is configured based on one or more data structures that cross-reference multiple analog voltage values with multiple target intercept indicators including the target intercept indicator value and that cross-reference said multiple analog voltage values with multiple target slope indicators including the target slope indicator value.

3. The system of claim 1, wherein the ADC is configured to generate said digital bit value by quantizing the analog voltage to one of a predetermined set of possible analog voltages.

4. The system of claim 1, further comprising a voltage divider circuit, coupled to the single pin, configured to provide said analog voltage to the single pin.

5. The system of claim 1, wherein said digital bit value is a 6-bit value.

6. The system of claim 2, wherein the control logic comprises a different data structure that cross-references the encoded target intercept indicator value with said target intercept and cross-references the encoded target slope indicator value with said target slope.

7. The system of claim 2, wherein said one or more data structures comprises one or more graphs, said one or more graphs including multiple curves, at least one of said multiple curves associated with said target intercept and another one of said multiple curves associated with said target slope.

8. The system of claim 3, wherein the control logic comprises a data structure that cross-references said digital bit value with the target intercept and the target slope.

9. The system of claim 6, wherein the control logic is configured to use said another data structure to identify said target intercept and said target slope.

10. The system of claim 7, wherein said curve associated with the target slope has a stair-step pattern, and wherein said curve associated with the target intercept has a triangular wave pattern.

11. The system of claim 7, wherein said curve associated with the target slope has multiple segments, each segment corresponding to a different one of the multiple target slope indicators, and wherein said curve associated with the target intercept traverses a range of the multiple target intercept indicators for each of said multiple segments.

12. The system of claim 10, wherein the curve associated with the target slope increases as the multiple analog voltage values increase, and wherein the curve associated with the target intercept rises for the first step in said stair-step pattern.

13. The system of claim 10, wherein the curve associated with the target slope increases as the multiple analog voltage values increase, and wherein the curve associated with the target intercept falls for the first step in said stair-step pattern.

14. The system of claim 10, wherein the curve associated with the target slope decreases as the multiple analog voltage values increase, and wherein the curve associated with the target intercept rises for the first step in said stair-step pattern.

15. The system of claim 10, wherein the curve associated with the target slope decreases as the multiple analog voltage values increase, and wherein the curve associated with the target intercept falls for the first step in said stair-step pattern.

16. A method, comprising:
receiving a discrete analog voltage on a single integrated circuit input pin of an analog-to-digital converter (ADC), said discrete analog voltage being operable to control a lead angle in a motor;
determining a target intercept and a target slope of a lead angle curve based on said discrete analog voltage by:
generating a digital bit value comprising a plurality of digital bits representing said analog voltage, said digital bit value encoding a target intercept indicator value as at least a first of the plurality of digital bits and a target slope indicator value as at least a second of the plurality of digital bits according to the discrete analog voltage; and
identifying a target intercept and a target slope for a lead angle curve by decoding the digital bit value to determine the target intercept at least partially according to the first of the plurality of digital bits and determine the target slope at least partially according to the second of the plurality of digital bits, wherein the target intercept indicates a lead angle value at zero motor rotation frequency, and wherein the target slope indicates a rate of change of the lead angle curve corresponding to a change in the motor rotation frequency; and
operating a motor using said lead angle curve.

17. The method of claim 16, wherein generating the digital bit value comprises using a data structure that cross-references a set of target intercept indicators including the target intercept indicator value and a set of target slope indicators including the target slope indicator value with a range of analog voltage values.

18. The method of claim 17, wherein, in the data structure, each target slope indicator in said set of target slope indicators corresponds to a range of target intercept indicators.

19. The method of claim 17, wherein, in the data structure, each target intercept indicator in said set of target intercept indicators corresponds to a range of target slope indicators.

20. The method of claim 18, wherein, when the target slope indicators in said set of target slope indicators are sorted in ascending order, the range of target intercept indicators corresponding to the first of the target slope indicators rises as said range of analog voltage values rises.

* * * * *